May 2, 1950 W. F. RUST ET AL 2,505,793
RADAR TRAINING DEVICE
Filed May 5, 1945 8 Sheets-Sheet 1

INVENTORS.
WILLIAM F. RUST
DONALD G. INMAN
BY Ralph L Chappell
ATTORNEY.

INVENTORS
WILLIAM F. RUST
DONALD G. INMAN
BY
Ralph L. Chappell
ATTORNEY.

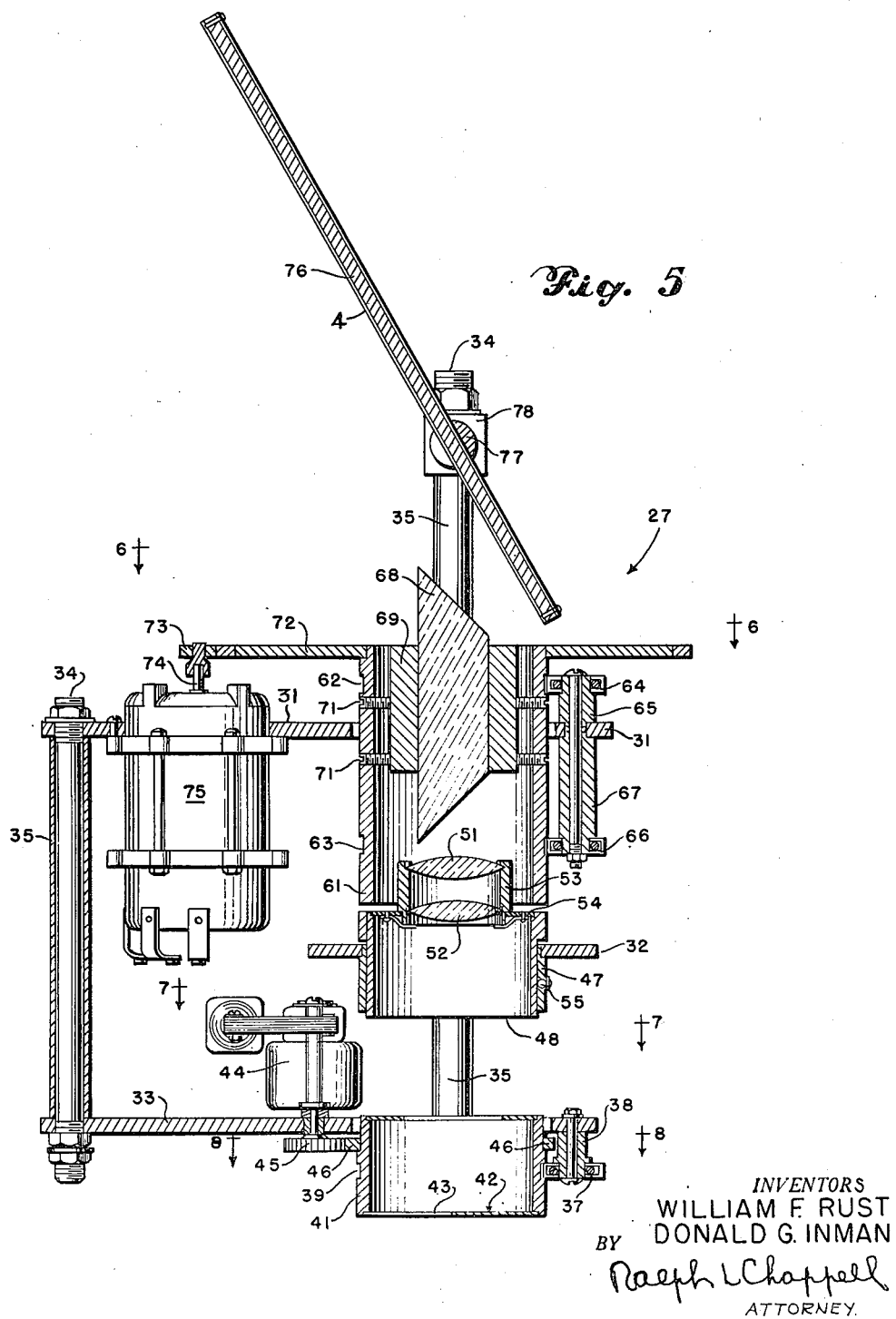

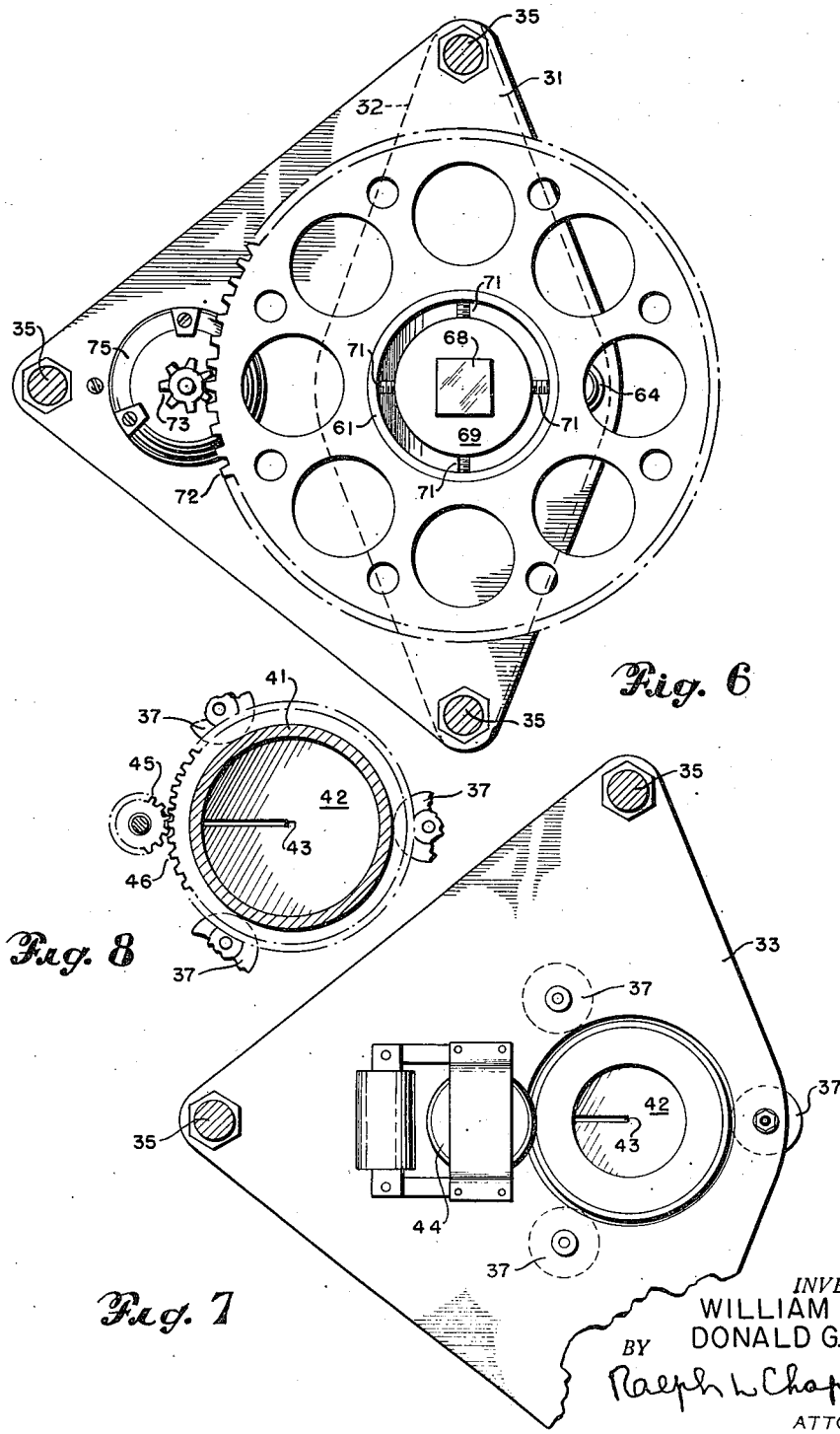

May 2, 1950 W. F. RUST ET AL 2,505,793
RADAR TRAINING DEVICE
Filed May 5, 1945 8 Sheets-Sheet 5

INVENTORS
WILLIAM F. RUST
BY DONALD G. INMAN
Ralph L. Chappell
ATTORNEY.

May 2, 1950

W. F. RUST ET AL 2,505,793

RADAR TRAINING DEVICE

Filed May 5, 1945

INVENTORS
WILLIAM F. RUST
DONALD G. INMAN
BY
Ralph L. Chappell
ATTORNEY.

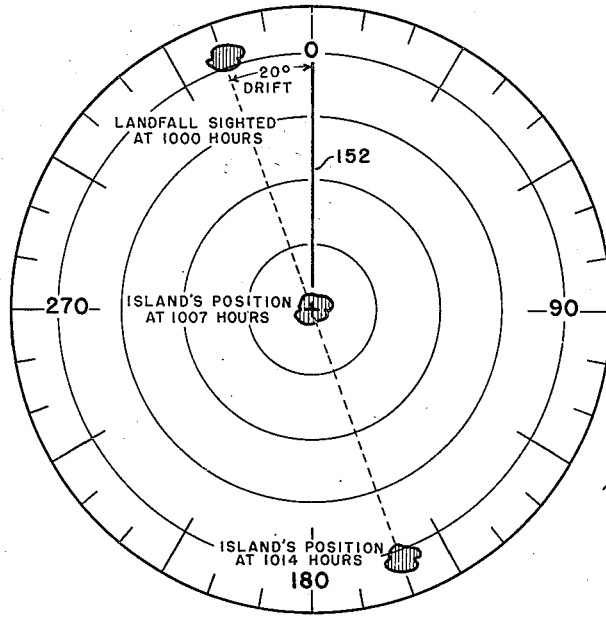
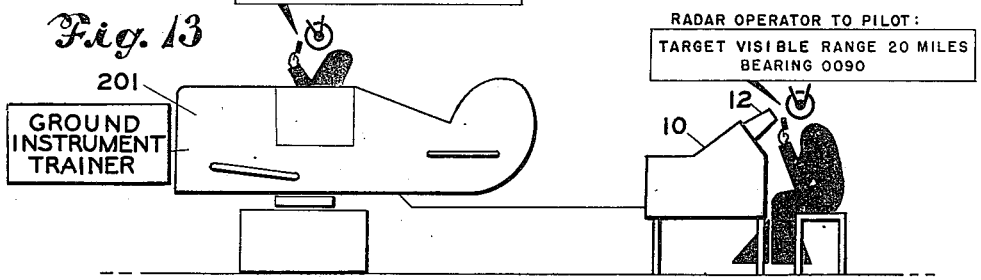
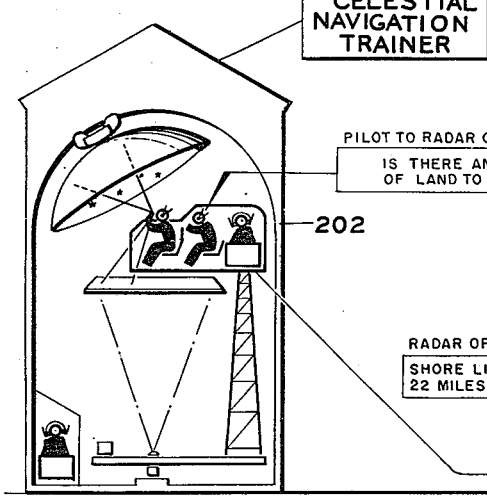
INVENTOR.
WILLIAM F. RUST
DONALD G. INMAN
ATTORNEY

INVENTOR.
WILLIAM F. RUST
BY DONALD G. INMAN
ATTORNEY.

Patented May 2, 1950

2,505,793

UNITED STATES PATENT OFFICE 2,505,793

RADAR TRAINING DEVICE

William F. Rust, Jr., and Donald G. Inman,
United States Navy

Application May 5, 1945, Serial No. 592,155

11 Claims. (Cl. 35—10.4)

(Granted under the act of March 3, 1883, as
amended April 30, 1928; 370 O. G. 757)

The present invention relates to apparatus for synthetic training in the use of radar equipment. The invention is applicable to synthetic training in the use of any of the several types of radar gear, but its greatest field of usefulness is in connection with airborne radar. In view of this, the general principles of the invention will be discussed in connection with a disclosure of a specific structure of the apparatus particularly suited to synthetic training in the use of a typical airborne radar unit.

Before discussing details of structure and operation, it is believed pertinent to point out certain of the inherent characteristics of modern types of airborne radar, in order that the subject matter of this disclosure may be fully understood and appreciated.

Radar—for the information of the beginner—is an instrument and a method of recognizing and locating distant objects by means of radio echo. The AN/APS-2 radar, which is of the PPI (Plan Position Indicator) type is widely in use and functions to locate objects such as land masses, surface vessels on the sea and aircraft in the air. It also indicates the relative distance between the observing aircraft and the object detected. The detection is accomplished through the use of radio waves and is portrayed visually by means of a cathode-ray tube indicator.

The radio wave transmitted is a train of extremely short pulses of radio frequency energy emitted into space by a highly directive, rotatable antenna. While rotating, the antenna sweeps the radio wave over a horizontal area. Any remote object in the path of the radio wave reflects some of the transmitted energy back to the rotating antenna. These reflected pulse signals are detected and indicated on the fluorescent screen of a cathode-ray tube by a luminous image painted by a moving point that appears to the eye as a sweeping line. Due to the long persistence of the fluorescence, a map becomes visible on the screen, although at any instant only the sweep carries the actual illumination.

A transparent scale in front of the cathode-ray tube screen is calibrated with a series of lines to indicate azimuth angle, that is, relative direction in the horizontal plane. A vertical lubber line above the center of the screen indicates the position of the aircraft. Around this point appear concentric circles of known radii which indicate known distances from the aircraft. By means of these circles the range to any object appearing on the tube may be estimated. In short, the radar instrument not only locates objects such as ships and aircraft, but also shows the location and shapes of land masses. Thus it becomes an extremely useful navigational aid, since the operator may obtain vital information with accuracy and speed, without reference to computation or translation data.

It may be mentioned, however, that the appearance of the typical radar presentation as it appears on the screen of the cathode-ray tube is somewhat confusing to the uninitiated, and it requires a considerable degree of skill and experience on the part of the operator to enable him to distinguish and recognize the various types of indications, and to identify them as land features, buildings, ships, or aircraft. This is due, in part, to the fact that since the fluorescent image is always fading, so that it always includes a bright portion following the brilliant sweep line and gradually blending into a very dim portion ahead of the sweep line. In addition, it will be remembered that as the observing aircraft flies over the terrain, the field of radar search moves with it. Consequently, the image on the scope will progress across the field of vision at the same rate, and will rotate in azimuth in response to turning of the aircraft. The image on the radar scopes does not move, however, and the effect of a progression of the image is given only by the fact that the sweep line paints the image in a somewhat different position on each successive revolution.

It may also be pointed out that although the characteristics of airborne radar are such that thorough training in its use is essential, yet it is of such a nature that effective training with operational gear is both difficult and expensive. In fact, the present invention suggests that it is advantageous to make no effort to use operational gear in the primary stages of training, but to provide entirely synthetic apparatus for training in the use of the actual service equipment. The desirability of such apparatus is believed self-evident; but to be fully appreciated it must be understood that operational radar gear, without more, is useless as a training aid. This is due to the fact that, to give characteristic radar presentation, the gear must be mounted in an aircraft in flight, so that its effective field of search will move progressively over the terrain and will shift in azimuth in accordance with the turning movement of the aircraft.

From the above, it will be apparent that the use of actual radar equipment for training purposes possesses two obvious disadvantages. First, the radar unit itself is extremely expensive, difficult to maintain, and includes much critical ultra high frequency electronic equipment. Second, the equipment must be actually flown in an aircraft, and it thus requires not only the services of the radar technicians, but also the services of a pilot, crew, and the use of large quantities of high octane gasoline. Possibly even more serious, however, is the fact that actual equipment is useless during periods of weather bad enough to ground the planes, and because the carrying capacity of any aircraft is so limited that the number of students that can receive simultaneous instruction is necessarily small.

It is, therefore, one of the principal objects of the invention to provide a radar training device wherein a simulated radar presentation is synthetically developed; to permit training without actual aircraft flight and thus without use of critical aviation supplies.

A further object of the invention resides in the provision of a synthetic radar training device of optical, rather than electronic, design; so that no critical electronic equipment will be required in its procurement or use; so that it will present no serious problems of maintenance; and so that, if desired, the scope may be made larger than now practical with cathode-ray tubes, to permit simultaneous instruction to a large group of students.

Another object of the invention is to provide a synthetic radar trainer which will closely simulate operational radar gear in general appearance and in mode of operation, so that students under instruction will become familiar with the visual as well as the technical characteristics of the operational equipment.

A further object of the invention resides in the provision of a synthetic radar device adapted for use in connection with grounded flying and navigation trainers of the type known in the art as celestial navigation trainers or instrument navigation trainers.

The foregoing objects are accomplished by the device illustrated in the drawings attached to and forming a part of the present specification. Essentially, the device includes a map or terrain chart, and an optical scanning system so arranged as to scan a small area of the chart, and to project an image of the area thus scanned onto a screen. The screen is coated with fluorescent material of high persistence so that the image painted by the sweep line of the scanning system can be seen. This gives an appearance closely simulating the appearance of an actual radar scope.

The terrain transparency is mounted on a course recording unit, so that it can be moved along at a speed corresponding to the scale speed of a plane, in order that the portion of its area scanned by the optical beam will progress over the map surface in the same manner that the area scanned by actual radar gear equipment progresses with the movement of the aircraft. The trainer is also provided with optical means to rotate the entire image on the face of the scope and to thus simulate the effects of turning movements of the plane.

Referring now more particularly to the drawings:

Figure 5 is a detail central sectional view of the scanning mechanism and image-inverting system.

Figure 6 is a plan sectional view taken substantially on the plane of the line 6—6 in Figure 5.

Figure 7 is a detail plan sectional view taken substantially on the plane of the line 7—7 in Figure 5.

Figure 8 is a detail plan sectional view taken substantially on the plane of the line 8—8 in Figure 5.

Figure 12 is a face view of a typical presentation on the fluorescent screen of the device.

Figure 13 is a diagrammatic illustration of the unit shown in Figure 1 associated with and controlled by a conventional Link Trainer.

Figure 14 is a diagrammatic illustration of the unit of Figure 1 and is used with a celestial navigation trainer.

Figure 15:
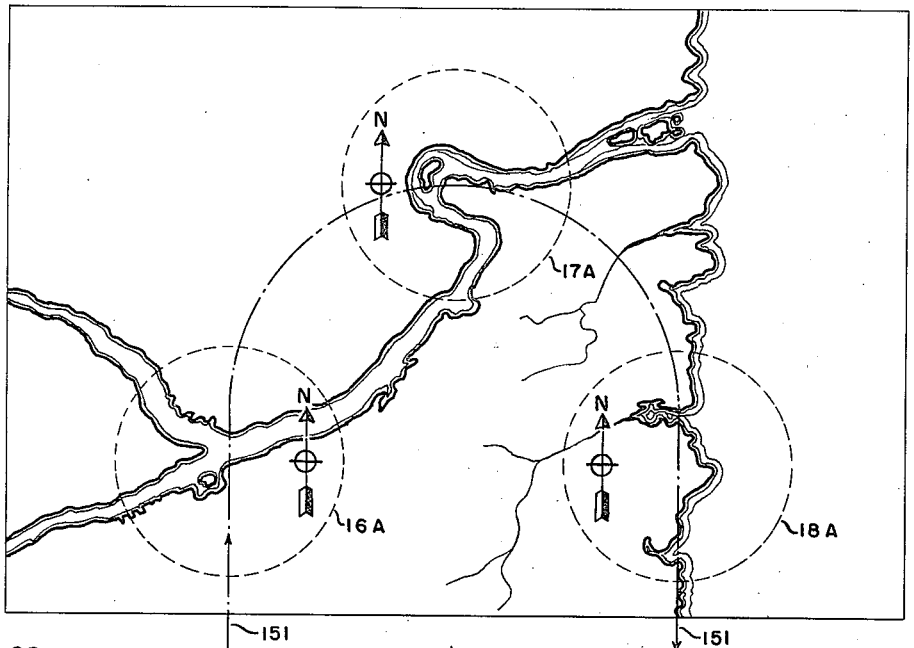
Figure 15 is a representation of a typical terrain transparency.
Figure 17:
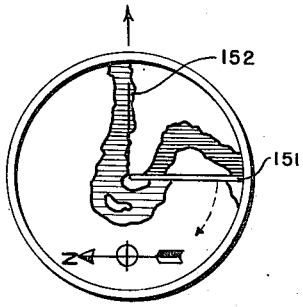
Figure 16:
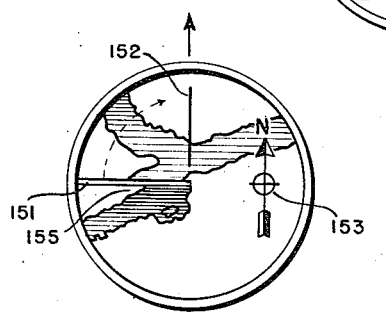
Figure 18:
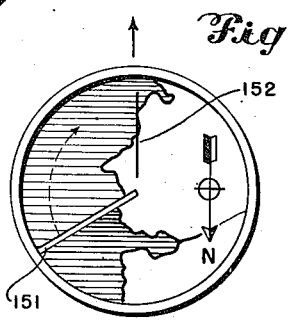

Figures 16, 17, and 18 are reduced scale representations of the appearance of the fluorescent viewing scope of the device at spaced-apart intervals as the equipment simulates a flight over the course indicated by broken lines in Figure 15, the individual views corresponding to the appearance of the scope when scanning the areas indicated by the dotted line circles 16A, 17A and 18A respectively.

Figure 1:
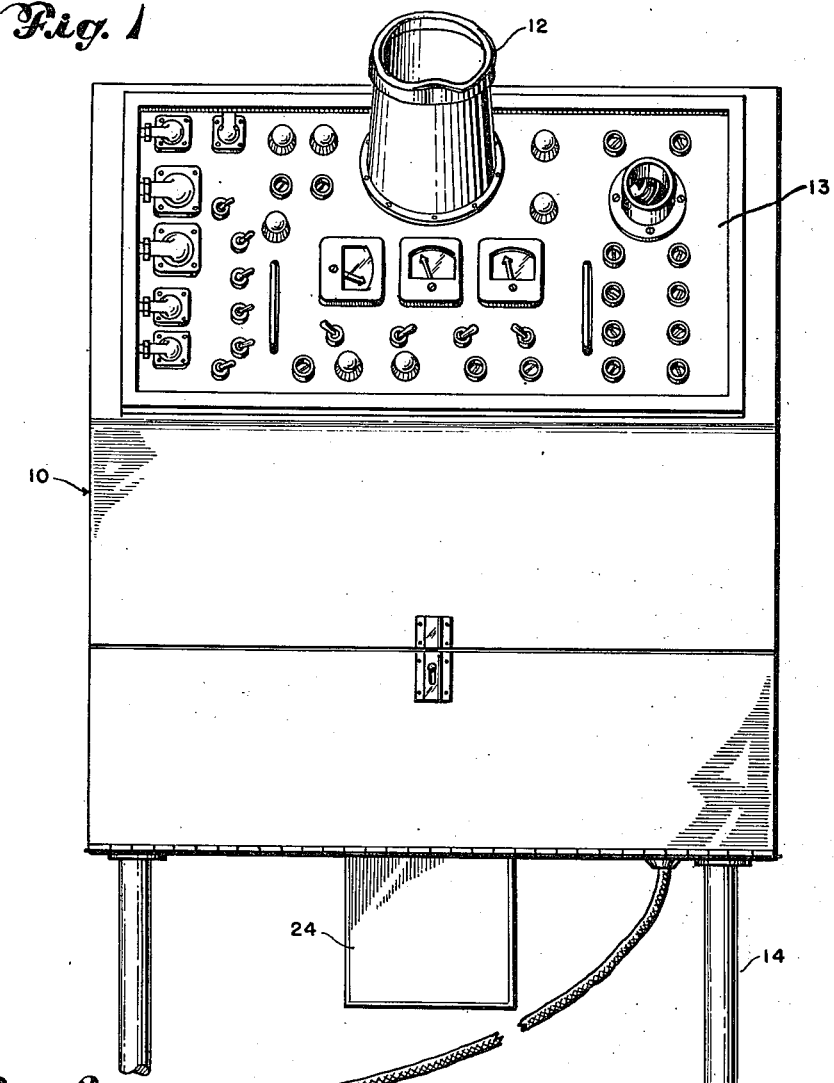
Figure 1 is a front view of the PPI cabinet of a synthetic radar training device as contemplated by this invention.
Figure 2:
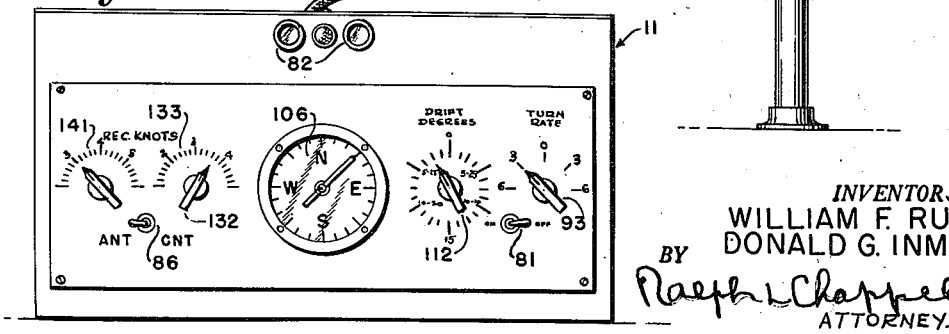
Figure 2 is a front elevational view of a control cabinet associated with the trainer shown in Figure 1.

The equipment illustrated includes, as shown in Figs. 1 and 2, a simulated PPI radar cabinet 10 and a remote control cabinet 11. The cabinet 10 simulates the appearance of the AN/APS-2 airborne radar unit and constitutes the student radar operator's station, while the control cabinet 11 is the pilot's station. The cabinet 10 includes a tubular viewing shade 12 centrally positioned in the front face 13 of the cabinet. The viewing shade 12 is similar to the shade used to view the cathode-ray tube on an actual radar unit, and thus gives a realistic appearance to the synthetic training apparatus. The appearance of operational equipment is also simulated by providing the front face 13 of the cabinet with a multiplicity of dummy meters, switches, control knobs, jacks, plugs and cable connections, exactly duplicating those present in the actual apparatus. It is contemplated that the cabinet will be provided with supporting standards 14 so that the viewing tube may be positioned at convenient height to be viewed by the student when seated.

Figure 3:
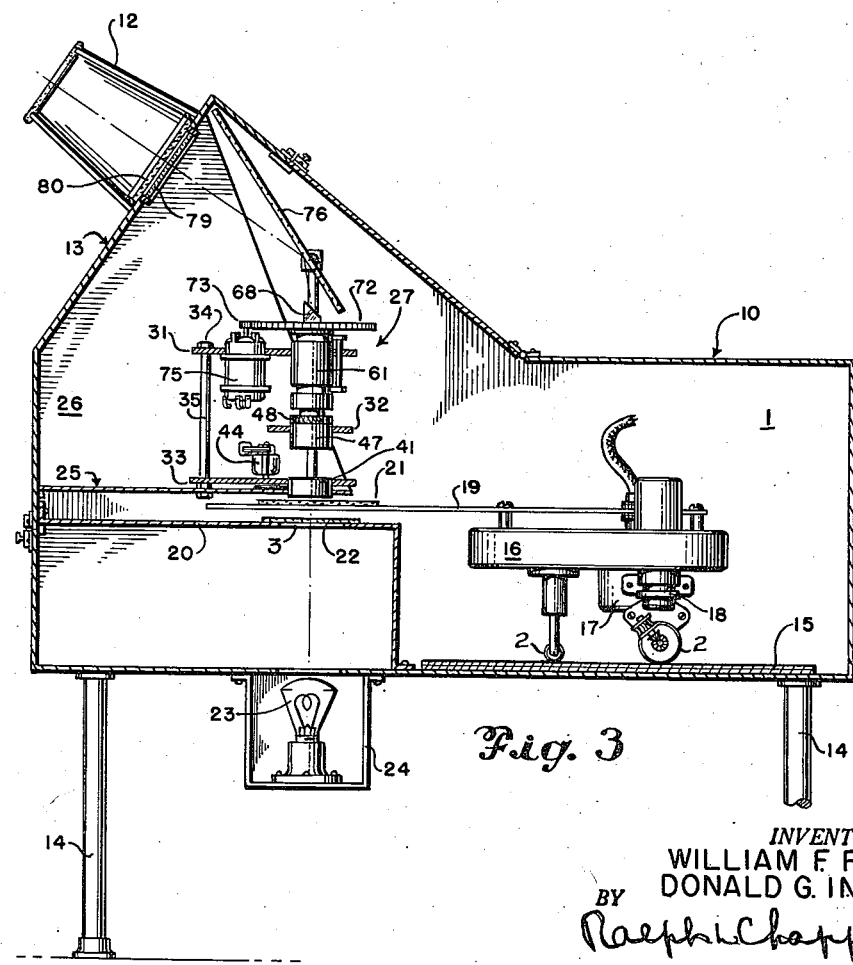
Figure 3 is a longitudinal sectional view through the equipment illustrated in Figure 1.

The cabinet 10 includes, in general, a hollow interior compartment 1 having a flat table surface 15 in its rearmost portion to provide a smooth operating plane on which a recording crab is positioned (Fig. 3). The recording crab 16 may be of the general type described in U. S. Patent No. 2,179,663, but since the details of its construction form no part of the present invention, it will not be described except to point out that it has a course control Selsyn 17 and a pair of driving motors 18, and is of such design that it may be electrically energized and caused to move in any direction about the plane surface 15. Since all of the wheels 2 on which it moves are geared together to steer themselves in parallel paths, its angular position will not change irrespective of the course it may take over the table surface 15. If desired, a chart or map may be placed on the surface 15 so that an inking wheel on the crab will make a permanent record of the path of its movement although this is not essential to the operation of the device.

Figure 4:
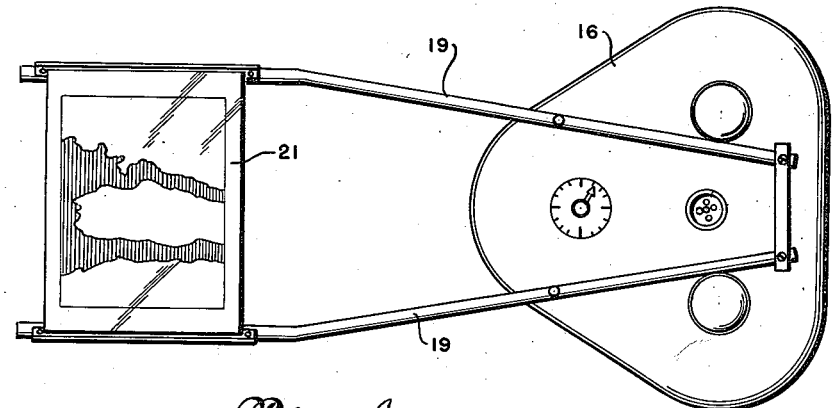
Figure 4 is a detail plan view of the terrain transparency or map associated with the optical unit and the course recording device upon which it is carried.

The crab 16 includes a pair of arms 19 extending forwardly over a boxlike partition 20 to support a map or terrain transparency 21 as shown in Fig. 4. Thus, the map 21 is supported directly above an opening 3 in the compartment 20, so that rays from the mercury vapor lamp 23 supported in the housing 24 will pass through a blue optical filter 22 to its lower surface.

The cabinet 10 also includes an interior frame consisting of the horizontal plate 24 and a pair of side plates 26 on which an optical and scanning unit, generally indicated at 27, is mounted as shown in Fig. 5. The scanning unit includes a top plate 31, center plate 32, and lower plate 33 rigidly secured to each other by three tiebolts 34 extending through spacing sleeves 35.

The lower plate 33 carries three ball bearings 37 mounted on posts 38. These bearings run in a circular runway 39 and thus provide a rotatable mounting for a cylindrical sleeve 41. The lower end of the sleeve 41 is closed by an opaque metal disc 42 having a radial scanning slot 43 extending from the center of the disc to its outside edge. The entire assembly of the cylindrical sleeve 41 and the disc 42 are rotated by an electric motor 44. The motor 44 is mounted on the plate 33 and has a driving pinion 45 in mesh with a driven ring gear 46 on the sleeve 41.

The center plate 32 serves as a support for a lens assembly to focus the image projected through the scanning slot. A downwardly extending sleeve 47 is carried by the plate 32, and a lens barrel 48 is mounted for telescoping movement in the sleeve. The lens barrel 48 in turn supports a pair of condensing lens 51 and 52 secured in the lens tube 53 on a closure disc 54 at the top of the lens barrel 48. The entire lens assembly is vertically shiftable so that the device may be focused by raising or lowering the lens barrel 48 in the sleeve 47. A spring-pressed ball detent 55 is provided on the sleeve 47 to maintain sufficient friction to keep the lens assembly in position after its focus is set.

The scanning assembly 27 also includes means for orienting the image projected from the map. In general, this consists of a dove prism 68 and remote control mechanisms to effect its rotation. The orienting device includes a cylindrical barrel 61 having an upper bearing runway 62. The barrel 61 extends between three upper ball bearings 64 mounted on the posts 65 to run in the upper runway 62, and a matching set of three lower ball bearings 66 mounted on posts 67 to run in the lower runway 63. The barrel 61 supports a dove prism 68 carried in a mounting block 69. The block 69 is secured in the center of the barrel 61 by a plurality of set screws 71, which extend inwardly from the wall of the barrel 61. These screws not only secure the mounting block in fixed relationship with the barrel, but also provide means for adjusting the block to bring the prism 68 in exact alignment with the center of rotation of the barrel 61. The lens barrel 61 is rotatably driven by a Selsyn motor 75, through a pinion 73 which meshes with a large spur gear 72 on the upper end of the lens barrel 61.

A front surface mirror 76 is mounted directly above the prism 68 so that it will reflect light rays from the prism 68 to the surface of the viewing screen 79 as shown in Fig. 4. The mirror is supported on a cross-bar 77 extending between mounting blocks 78 secured to the upper ends of two of the tiebolts 34, so that it may be adjusted to lie at an angle to the axis of the optical system of the scanning unit 27. The screen 79 is treated with a fluorescent coating that glows with a yellowish color when the coating 4 is energized by light from the mercury vapor lamp 23. A yellow filter 80 is placed over the screen 79, and dial markings, such as a compass rose, radial range rings, and lubber line are marked on the filter, so that the appearance of the screen 79 is identical to the appearance of the cathode-ray tube of the actual radar unit.

Figure 9:
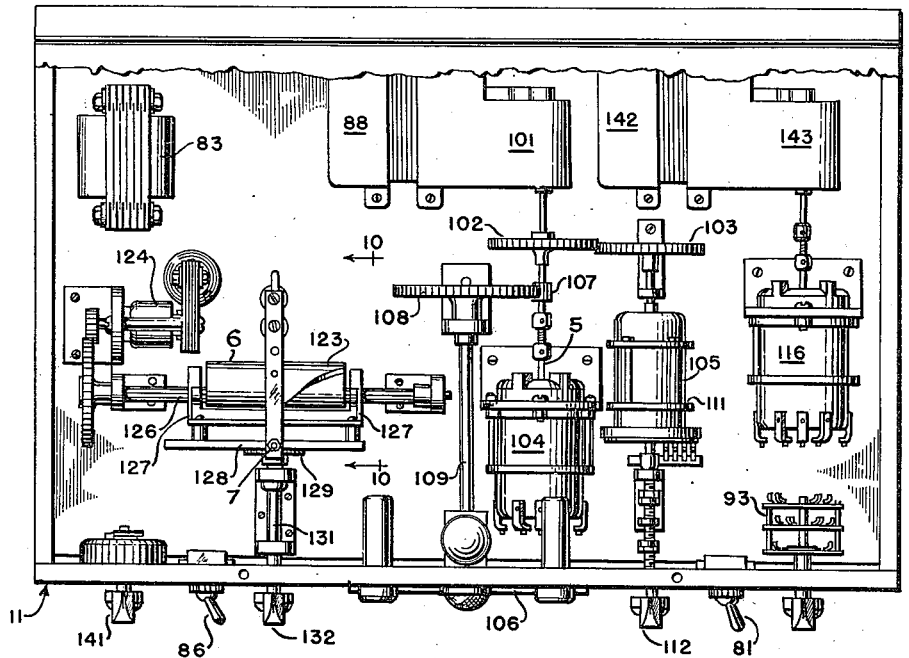
Figure 9 is a plan view of the control cabinet illustrated in Figure 2, with cover removed.

The control cabinet 11 (Figs. 2 and 9) associated with the trainer includes a main switch 81 through which power from an outside line is fed through the fuses 82 to the primary winding of a step down transformer 83 and through the leads 84 and 85 (Fig. 11) to a double pole, double throw switch 86.

The lead 85 from the power input to the control cabinet also extends directly to the field winding 87 of a turn motor 88. The circuit from the winding 87 extends through the resistance 89, which includes two adjustable taps 91 and 92 connected through a five point double pole switch 93 to the armature 94 of the turn motor 88 and thence to the lead 84. The circuit is so designed that the center contact 95 of the switch 93 is the "off" position, and that the contacts on 96 and 98 on one side, and 97 and 99 on the opposite side of the "off" position reverse the polarity of the armature 94 to cause it to rotate at either of two predetermined speeds, and in either forward or reverse direction. Thus the direction of the motor rotation is determined by moving the switch 93 to the right or left side of the "off" position, while the motor speed depends on whether the switch is moved to the first or second point.

The turn motor 88 operates through the reduction gears 101 and the pair of spur gears 102 and 103 to cause simultaneous rotation of the armatures of the Selsyn generators 104 and 105. Preferably, the adjustable taps 91 and 92 of the resistor 89 are positioned to give resistance values such that the Selsyns 104 and 105 will be rotated at a speed corresponding to standard rates of turn of aircraft. These standard turn rates may be three degrees per second for the left and right switch points 96 and 97, and six degrees per second for the left point 98 and right point 99.

The armature shaft of the Selsyn 104 is coupled to the pointer of a course indicating dial 106 through a pinion 107, gear 108, and shaft 109, so that the relative position of the Selsyn 104, which indicates the simulated heading of the aircraft, is indicated on the panel of the instrument control cabinet.

The Selsyn motor 105 is similar to the Selsyn 104, but is mounted with its stator in a rotatable cradle 111 controlled by the knob 112 on the control cabinet 11. The arrangement is such that when the knob 112 is set to zero position, the Selsyn 104 and 105 are exactly in phase and the compass course indicator will register the true course that the apparatus is simulating. However, it is the function of the control knob 112 to arbitrarily rotate the Selsyn 105 and move it out of phase with the Selsyn 104 in order to "set in" simulated wind drift and make it possible to duplicate the condition encountered by an actual aircraft in a cross wind.

When the PPI unit is used in connection with the control cabinet, the Selsyn transmitter 104 is directly connected to the Selsyn repeater 75, so that the position of the transmitter 105 serves to control the movement of the prism 68 of the scanning unit and thus orient the image seen on the screen 79, in accordance with the heading shown on the dial 106. Similarly, the Selsyn transmitter 105 is directly connected to the Selsyn repeater 17 which serves as a course control for the crab 16. All of these Selsyns, and also the Selsyn transmitter 116, are supplied with low voltage power from the secondary winding of the transformer 83.

From the above, it will be apparent that when the apparatus is set for zero wind drift the operation of the Selsyn transmitters 104 and 105, which are geared together by the spur gears 102—103, will cause the prism 68 to be rotated in exact accord with the course that the crab 16 moves, so that the image on the screen 79 will be oriented in response to changes in the relative direction of movement between the chart 21 and the optical unit 27. When properly oriented, the image on the screen progresses directly downwardly over the screen 79 as the crab 16 moves the terrain map 21. This simulates the condition existing when an airplane carrying the actual radar unit is flying in still air, for the only apparent movement of the terrain is straight downwardly along the lubber line. In the operational radar gear, however, a side wind will result in a condition of wind drift, in which the sidewise drifting of the plane with respect to the ground causes the terrain image to move diagonally across the screen rather than straight down the lubber line. This condition is simulated in the trainer here disclosed by shifting the knob 112 to rotate the cradle 111 and move the Selsyn 105 out of phase with the Selsyn 104 shown in Fig. 9. When this is done, the orientation of the terrain image will be at variance with the heading of the aircraft. The angle of drift to left or right is directly readable on the dial 112.

Figure 10:
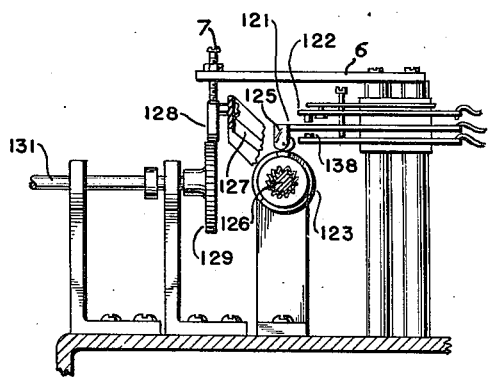
Figure 10 is a detail sectional view of the course recorder interrupter unit and is taken on the plane of the line 10—10 in Figure 9.

The ground speed motors 18 of the crab 16 are energized through the switch 86 and through a pair of contacts 121 and 122 (Fig. 10) provided with a mechanical interrupter to govern the rate of movement of the crab and thus simulate different speeds of the aircraft. The interrupter includes a wedge-shaped cylindrical cam 123 driven at a constant speed by a small motor 124. The cam 123 acts on a cam follower 125 to periodically open and close the contacts 121 and 122 and thus intermittently energize the motors 18 which advance the crab 16. The different relative speeds of the crab are obtained by shifting the cam 123 longitudinally along its shaft 126 so as to cause longer or shorter periods of motor operation during each revolution of the cam. The cam is manually shifted along its shaft 126 by a pair of arms 127 secured to a rack bar 128 in mesh with a gear 129 carried on a shaft 131. Rack 128 is maintained in mesh with gear 129 by spring 6 and screw 7. The shaft 131 extends through the front of the instrument cabinet and is controlled by a knob 132 so that rotation of the knob will move the cam 123 along its shaft, to effect an increase or decrease in the apparent speed of travel of the crab. A dial 133 is associated with the knob 132 to show the indicated scale speed at which the recorder crab 16 is traveling.

Figure 11:
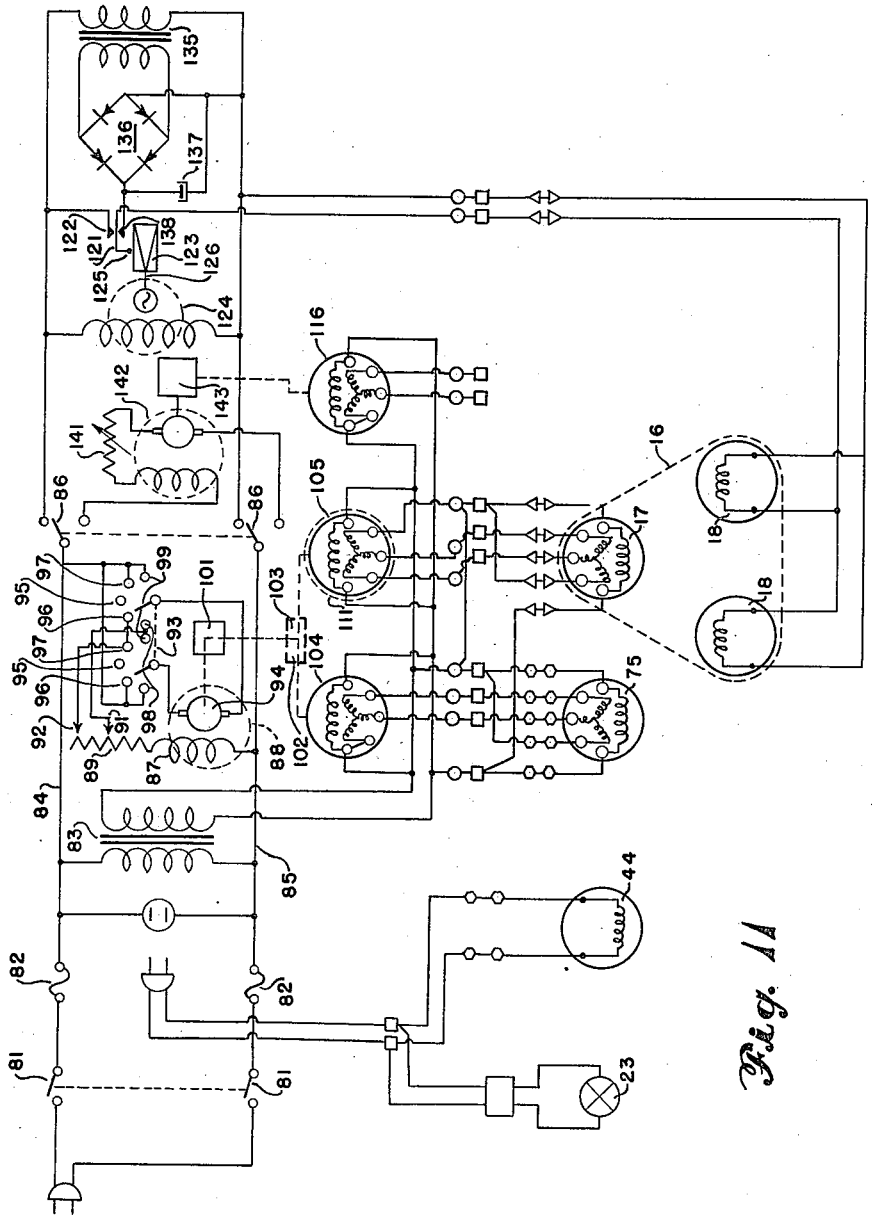
Figure 11 is a schematic wiring diagram of the electric circuit associated with the trainer.

The electrical circuit illustrated in Figure 11 also includes a braking transformer 135, a copper oxide rectifier 136, and condenser 137 connected directly to the switch 86 and arranged to supply low voltage direct current to the contact 138. The contact 138 is arranged to close with the contact 121 immediately after the contacts 121 and 122 open. The purpose of this low voltage direct current is to act as a brake to bring the motors 18 to an immediate stop when the contacts 121, 122 open, thus preventing any overrun which might otherwise occur and give an incorrect scale of advance to the crab 16.

The particular form of the invention disclosed in the drawings of this application is designed so that it may be used with either of two different types of course recorder crabs. The type illustrated is characteristic of and is arranged to electrically match the mechanism of a standard ANT, Instrument Navigation Trainer of the operational type disclosed in Link Patent Nos. 1,825,462 and 2,179,663, so that if desired, the entire control cabinet 11 may be eliminated and the crab 16 and sweep motor 44 can be directly controlled from the electrical circuits of the Link. This arrangement is illustrated diagrammatically in Figure 13.

It is also advantageous to provide a trainer circuit so designed that it may be used with a recorder crab of similar mechanical structure but different electrical characteristics, so that the devices may be electrically matched to and controlled by a Celestial Navigation Trainer of the standard Link type. Since these two types of navigational trainers utilize recording crabs having different electrical characteristics, the control cabinet here illustrated is designed to permit control of either type of crab. To this end, the opposite contacts of the double pole, double throw switch 86 are connected through a rheostat 141 to the windings of the CNT turn rate motor 142. This motor acts through a reduction gearing 143 to control the position of the armature of the CNT ground speed transmitting Selsyn 116. In the wiring diagram shown, the field of this transmitter 116 is energized directly from the secondary windings of the transformer 83, but the armature is shown with an open circuit. It should be understood, however, that when this control cabinet is utilized in connection with a course recorder crab of the CNT type, the ANT—CNT switch 86 is thrown in the opposite position from that indicated in Figure 11, so that the present circuit to the ground speed motors 18 will be opened and that the armature of the CNT ground speed transmitter 116 will be electrically connected to a pair of Selsyn repeaters carried by the recorder crab. These repeaters take the place of the ground speed motors 18 and are arranged to drive the crab at a speed governed by the speed of rotation of the motor 142 and Selsyn transmitter 116.

The operation of the device is as follows:

The mercury vapor lamp 23 will illuminate a portion of the search area chart 21 so that a small circular portion of the chart immediately under the optical scanning unit 27 can be repeatedly line-scanned by the slot 43. The slot 43, rotating in the scanning barrel 41, will serve as a sweep to define what we may term as a range area of the chart 21. Light passing through the slot will be projected in a line image from the slot through the lenses 51 and 52, and through the dove prism 68 to the mirror 76, where it will be reflected to the interior fluorescent coating of the screen 79. The blue filter 22 serves to block certain light frequencies present in the light source 23, so that the only rays reaching the screen are in the blue range of the spectrum. These blue rays effectively energize the fluorescent coating of the screen but can not pass through the yellow filter 80, so that the light rays themselves are invisible to the operator. However, the fluorescent coating of the screen 79 glows with a yellowish fluorescent light which can be seen through the yellow filter.

The fluorescent coating of the screen 79 has a high degree of persistence, so that as the scanning disc 42 revolves the line image painted on the screen 79 energizes the screen sufficiently so that, although the image is constantly fading, it is visible over the entire screen. The result of this is that the appearance of the screen 79 is identical with the appearance of an actual cathode-ray tube of the radar equipment. However, it is to be noted that while the cathode-ray tube is scanned by the point of an electronic beam moving so rapidly that it gives the appearance of a line, the present equipment provides actual line scanning from a powerful light source. It follows, of course, that a much greater light intensity may be projected to the screen 79 with the equipment here disclosed than with any present known types of cathode-ray tubes. Thus it is entirely feasible to utilize the principles of the present equipment for class-room demonstrations, and large screens up to 18 inches in diameter have been successfully used.

The chart 21 is carried by the recorder crab 16 so that movement of the crab according to the controls of the control cabinet 12 or of a grounded trainer will cause relative movement between the range area defined by the scanning disc 42 and the search area which includes the entire area of the chart 21. Thus as the crab 16 moves the image on the screen 78 progresses accordingly. In the operational radar gear the image on the scope is always oriented in accordance with the heading of the aircraft. This condition is duplicated in the present device by coupling the Selsyn transmitters 104 and 105 so that the Selsyn repeater 75 moves synchronously with the Selsyn course control repeater 17 carried by the crab 16. Thus the dove prism 68 is moved in response to changes in course of the flight to orient the image appearing on the screen 79. It is characteristic of the dove prism 68 that it causes an inversion of an image passed through it when it is rotated about its long axis. This apparent movement of the image is double the angle of rotation of the prism so that the image is completely inverted in response to a 90° movement of the prism and turned over twice in response to a complete revolution of the prism. For this reason the prism 68 is geared to rotate in synchronization with but at half of the angular rate of the driving wheels of the crab 16.

In Figure 15, a typical terrain chart is illustrated, and a flight course is indicated by the broken line 151. As the flight progresses along his course, the range area scanned by the slot 3 will progress as indicated by the three successive dotted line areas 16A, 17A, and 18A. The course indicated by the broken line 151 includes a 180° turn, so that its heading in the range area 18A is exactly opposite to the heading in the range area 16A.

In the present disclosure, the map 21 and scanning unit 27 do not move in angular relationship to each other, but the correct orientation of the image is obtained by rotating the prism 68 in response to changes of course of the range area over the map. Thus if a course is being traced along the line 151 the heading of the plane will be due north and the lubber line 152 will lie parallel to the compass arrow 153. At this time, the successive rotations of the sweep line 154 will cause each successive image painted on the screen to be slightly offset from each other in a vertical direction only, as indicated at 155. In turning movements, this offset will be angular as well as vertical, since by the time the flight reaches the range area 17A the course will be directly east, and the prism will have oriented the image as shown in Figure 17, when the lubber line will point east. Similarly, when the turn has progressed to the point indicated at 18A, the lubber line will point due south, as shown in Figure 18.

To use the device for training, the student radar operator is seated at the cabinet 10 so that he may view the image on the fluorescent screen 79 through the viewing tube 12. An instructor, or another student, is seated at the control cabinet 11, where he acts as "pilot" to control the course of a simulated aircraft flight. They should preferably be provided with standard microphones and headphones, so that they may maintain communication with each other during training in the same manner as in actual flight. To accomplish the illusion of flight, the pilot throws the switch 81 to illuminate the mercury vapor lamp 23 and sweep motor 44, and to energize the circuits of the control cabinet. This will cause a simulated radar image to appear on the screen 79, so that as the "pilot" directs the course of the flight by manipulation of the controls of the cabinet 11, the radar operator can match his radar information against a map of the area of the flight, and inform his pilot as to course and position, as well as ground speed, drift angle and the location of targets lying beyond eye visibility. Students should be instructed to pick out well-known targets on the scope and report continuously the range and bearing of these targets in such a manner as to direct the pilot. Under these directions the pilot will maneuver the simulated aircraft to follow the course as suggested by the radar operator.

Simple navigational hops should first be undertaken. If desired, the radar operator and his pilot, with the instructor's help, might lay out a flight plan between two selected points. The flight plan should be made with some changes in the course of flight. For example, a course should be set out to sea for 100 miles and then a turn made by dead reckoning to the correct heading for arriving at a prearranged landfall. The radar operator would then watch his scope until the first landfalls appear as signals (they will first appear as brilliant flashes on the screen of this device) and then, by using navigation charts, determine where he is. As soon as the first landfalls are observed and the student has some idea of their identification, he should begin a rather continuous radio telephone procedure advising the pilot of what he sees. He should report not only the correct heading to the pilot, but also indicate to him all targets which are visible and give their bearing and range so that the pilot can also check his navigation charts.

The effect of wind should also be introduced to the student at an early stage in his training. After setting the course and applying a wind angle drift, the student should learn to determine a correct heading for making a direct ground track to a given target. To make the problem more interesting, the wind direction and velocity may be changed during the flight, so that the dead reckoning of the student will be in error, and so that he must rely on the simulated radar indication to determine position, drift angle, and ground speed.

A typical problem is diagrammatically illustrated in Figure 12. At 100 hours the radar picks up target at 21 miles range and 340 degrees azimuth. Aircraft course is not altered and at 1007 hours the target which appears to be a small island is at zero range, directly under the aircraft. Under these conditions, the aircraft has covered 21 miles in seven minutes, going an average ground speed of 3 nautical miles per minute or 180 knots. The drift angle in this case can be determined by noting the position of a fixed target before and after one or more suitable time intervals, and estimating the angle which a line through these points makes with the lubber line 152 in the illustrated problem. If the conditions are not changed the position of the island at 1014 hours would be at range 21 miles azimuth 160 degrees as shown.

Thus by utilizing the structure shown and described in the present disclosure, it is possible for the student radar operator and his pilot to substantially duplicate a flight over any terrain of which a map is available. Obviously this may be used to teach the rudiments of aerial navigation but if desired, it may also be used to brief air men prior to attacks on enemy targets by putting them through a training procedure utilizing charts of the enemy positions to be attacked so that they may simulate the entire flight plan in training before making the actual strike.

It is believed worthy of note that the structure shown permits the student pilot to direct the simulated course of the aircraft in any direction over the map surface and to vary the speed at which the simulated flight is made within a range corresponding to the range of speeds of a given type of aircraft. Moreover, the optical orienting means for rotating the image of the map on the screen 79 is directly coupled to the course and wind drift mechanism, so that the orienting means operate in response to changes in course of the crab with respect to the optical scanning devices. That is, as the map moves so that the relative movement between it and the scanning unit causes the scanning unit to trace a given course over the map, the dove prism is rotated so that the image presented on the screen 79 is positioned with the lubber line lying in the direction of simulated heading of the aircraft. Moreover, this effect may be varied to simulate wind drift to right or left by an arbitrary setting of the drift angle control knob, so that the heading of the aircraft and its course are not the same.

It has been previously mentioned that the PPI unit in the cabinet 10 may be used in connection with a ground instrument trainer of the type disclosed in the Link Patent No. 2,179,663. When so used, the control cabinet 11 is disconnected from the device and the ground speed motors 17 and the course directing Selsyn repeater are electrically connected to the mechanism of the ground trainer 201, as indicated in Figure 13. The mechanism of the trainer includes an electrical interrupter cam similar to the cam mechanism illustrated in Figure 10, so that the speed of the crab 17 is governed by the simulated speed of the ground trainer. Also, the course controlling Selsyn repeater 18 is connected to a Selsyn transmitter associated with the trainer and controlled in position by the heading of the trainer so that the crab 17 will be moved exactly in accordance with the simulated flight of the instrument navigation trainer.

The principles of the invention may also be utilized with a Link Celestial Navigation Trainer 202 as illustrated in Figure 14. Since this type of trainer is well known in the art, it is not believed necessary to describe the mechanical details of its structure except to point out that it includes in general a housing having a simulated sky and aircraft cockpit and that it includes mechanisms whereby the simulated course may be traced on a chart or map by a recorder similar to the crab 17. When used in this connection, cabinet 10 of the present disclosure is provided with a crab having driving motors electrically matched to the mechanism of the CNT, but the operation of the device is otherwise identical. In the case of either of these navigational trainers, it will be understood that the PPI cabinet 10 of the trainer is controlled directly from the mechanism of the grounded trainer so that the presentation on the screen 79 will be in accordance with the simulated course flown.

From the foregoing, it will be apparent that by practicing the teachings of the present invention, it is practicable to provide realistic synthetic training that accurately reproduces the problems of the type encountered in actual use of airborne radar instruments. Thus, it is feasible to train radar operators and pilots in the use of this type of equipment without the necessity of performing actual flights in a radar equipped plane and without requiring the use of any complicated electronic apparatus or expensive equipment of elaborate nature.

While the specific structure of the present disclosure is believed to be typical of the inventive principles and well illustrative of the inventive thought of this disclosure, it should be understood that it is but one embodiment of the broad concept of the invention and that various other modifications and variations may be made without departing from the spirit of the appended claims.

The invention, if patented, may be manufactured and used by or for the Government for Government purposes without the payment to us of any royalty thereon or therefor.

Having thus described the invention, what is claimed is:

1. In a radar training device, the combination of a search area chart, means to illuminate at least a portion of said chart; a fluorescent viewing screen, and optical means defining a range area on said chart; the optical means including lenses interposed between the chart and the viewing screen to project an image of a portion of the chart to the screen, masking means to confine the light projected from the chart to the screen to a single line of light positioned radially of the range area, means for rotating said line of light to effect repeated radial line scanning, means for producing relative motion between the search area chart and the optical means to shift the range area progressively across the search area; means for orienting the image of the range area with respect to the viewing screen, and means operated by the relative motion producing means to actuate the said orienting means and orient the image on the screen in a position corresponding to the direction of movement of the range area over the search area.

2. In a radar training device, the combination of a search area chart, means for illuminating the chart, a fluorescent viewing screen, and optical means defining a range area on said chart; the optical means including magnifying lenses interposed between the chart and the viewing screen to project an enlarged image of a portion of the chart to the screen; masking means to confine the light projected from the chart to the screen to a single line; said means comprising an opaque plate having a single slot; mechanical instrumentalities including a motor for shifting the position of the opaque plate to effect repeated line scanning of the range area, and means for orienting the image of the range area with respect to the viewing screen, said means including a dove prism.

3. In a radar training device, the combination of a search area chart, means for illuminating the chart, a fluorescent viewing screen, and optical means defining a range area on said chart; the optical means including magnifying lenses interposed between the chart and the viewing screen to project an enlarged image of a portion of the chart to the screen; masking means to confine the light projected from the chart to the screen to a single line positioned radially of the range area, and means for rotating said circular disc to effect repeated radial line scanning of the range area.

4. In a radar training device, the combination of a search area chart, means for illuminating the chart, a fluorescent viewing screen, and optical means; said optical means including a circular opaque disc positioned adjacent the search area chart and having a single radial slot; together with means for rotating said circular disc to effect repeated radial line scanning of a portion of the chart, and means for projecting an image from the scanning means to the viewing screen.

5. In a radar training device, the combination of a search area chart, means for illuminating the chart, a fluorescent viewing screen, and optical means defining a range area on said chart; the optical means including magnifying lenses interposed between the chart and the viewing screen to project an enlarged image of a portion of the chart to the screen; masking means to confine the light projected from the chart to the screen to a single line; and means to repeatedly shift the position of the line to effect repeated line scanning of the range area, together with means for relatively moving the search area chart and the optical means to shift the range area progressively across the search area.

6. The combination of a light source; a fluorescent viewing screen, and means including lenses interposed between the light source and the viewing screen to project an image to the screen; together with masking means to confine the light projected to the screen to a single line; means for moving said masking means to effect repeat line scanning; a blue filter interposed between the light source and the fluorescent viewing screen, and a yellow filter covering the fluorescent screen to permit observation of the fluorescent glow of the screen, but block the transmission of the blue light from the light source.

7. The combination of a partially transparent chart having portions of varying optical density; means for directing light rays through said chart to illuminate at least a portion of the chart; and a fluorescent viewing screen; together with means including magnifying lenses interposed between the chart and the viewing screen to project a light image from the chart to the fluorescent viewing screen; masking means associated with the chart to confine the light projected from the chart to the screen to a line image, said masking means including an opaque plate having at least one transparent slot; means for moving said masking means to effect repeat line scanning of the chart; an optical filter to pass rays of the same spectrum range as the fluorescent material of the viewing screen covering said screen and a different color filter interposed between the light source and the screen.

8. In a radar training device, the combination of a light source, a search area chart, and a fluorescent viewing screen; together with means to project a light image from the chart to the screen, a mask associated with the chart to confine the light projected from the chart to the screen to a single line; means for moving said mask means to effect repeat line scanning of at least a portion of the chart; means for orienting the image of the chart with respect to the viewing screen; a colored optical filter interposed between the light source and the fluorescent screen, and an optical filter of different color covering the viewing screen.

9. In a training device, the combination of a search area chart support, a stationary viewing screen, optical means to project a light image of a range area portion of a search area chart on the chart support to the viewing screen, means for orienting the light image of a range area on the stationary viewing screen, means for moving the search area chart support at a selected velocity to shift the range area of a chart thereon progressively across the search area, direction control means for controlling the direction of movement of the search area chart support, and common control means operative on the image orienting means and the chart support direction control means to vary the orientation and direction through equal angles.

10. In a training device, the combination of a search area chart support, a stationary viewing screen, optical means to project a light image of a range area portion of a search area chart on the chart support to the viewing screen, means for orientating the light image of a range area on the stationary viewing screen, means for moving the search area chart support at a selected velocity to shift the range area of a chart thereon progressively across the search area, direction control means for controlling the direction of movement of the search area chart support, common control means operative on the image orienting means and the chart support direction control means to vary the orientation and direction through equal angles, and further control means for the direction control means operative independently of the image orienting means to vary the chart support direction control means through a selected angle whereby the chart direction simulates the effect of wind drift on the viewing screen.

11. In a radar training device, the combination of a search area chart support, a stationary ultra violet light source positioned to illuminate a chart on the support, a stationary fluorescent viewing screen, optical means to project a light image of a range area portion of a search area chart on the chart support to the viewing screen, means for orienting the light image of a range area on the stationary viewing screen, means for moving the search area chart support at a selected velocity to shift the range area of a chart thereon progressively across the search area, direction control means for controlling the direction of movement of the search area chart support, common control means operative on the image orienting means and the chart support direction control means to vary the orientation and direction through equal angles, and further control means for the direction control means operative independently of the image orienting means to vary the chart support direction control means through a selected angle whereby the chart direction simulates the effect of wind drift on the viewing screen.

WILLIAM F. RUST, JR.
DONALD G. INMAN.

REFERENCES CITED

The following references are of record in the file of this patent:

UNITED STATES PATENTS

| Number | Name | Date |
|---|---|---|
| 1,894,953 | Holst | Jan. 24, 1933 |
| 2,019,234 | Nistri | Oct. 29, 1935 |
| 2,179,663 | Link | Nov. 14, 1939 |
| 2,271,296 | Hargrave | Jan. 27, 1942 |
| 2,314,497 | Hargrave | Mar. 23, 1943 |
| 2,326,764 | Crane | Aug. 17, 1943 |
| 2,326,766 | Delarauelle | Aug. 17, 1943 |
| 2,364,539 | Link | Dec. 5, 1944 |
| 2,385,291 | Link | Sept. 18, 1945 |
| 2,413,633 | Jones | Dec. 31, 1946 |